United States Patent Office 3,819,734
Patented June 25, 1974

3,819,734
HYDROGENATION PROCESS
Vipin M. Kothari, Akron, and James J. Tazuma, Stow, Ohio, assignors to The Goodyear Tire & Rubber Company, Akron, Ohio
No Drawing. Filed May 5, 1972, Ser. No. 250,801
Int. Cl. C07c 5/06
U.S. Cl. 260—666 A                7 Claims

ABSTRACT OF THE DISCLOSURE

According to the invention there is provided a highly activated process for the hydrogenation of cyclopentadiene to cyclopentene by bringing the cyclopentadiene into contact with a catalyst comprising (1) nickel on a metal oxalate, said metal being selected from the groups consisting of magnesium and zinc, (2) at least one ligand selected from the group consisting of phosphines and phosphites while in the presence of hydrogen at temperatures from about 0° C. to about 200° C. and hydrogen pressure ranging from about 0 to about 10,000 pounds per square inch gauge (p.s.i.g.).

---

This invention is directed to a method of hydrogenation of hydrocarbons.

It is also directed to the discovery of a highly active hydrogenation catalyst. More specifically, this invention relates to a catalyst and a process useful for the selective hydrogenation of cyclopentadiene to cyclopentene.

The selective hydrogenation of unsaturated hydrocarbons to monoolefins and paraffin with a supported catalyst is well known in the prior art. The hydrogenation of unsaturated hydrocarbons with mixed oxalates and formates, i.e. nickel and magnesium or zinc oxalates (or formates) has also been reported.

In this invention, however, the active nickel/magnesium-oxalate catalyst is prepared and used with a ligand. This catalyst when used with the added ligand results in an activated catalyst which is far more active than the previously reported catalysts without any ligands.

Therefore, according to the invention there is provided a highly activated process for the hydrogenation of cyclopentadiene to cyclopentene by bringing the cyclopentadiene into contact with a catalyst comprising (1) nickel, on a metal oxalate, said metal being selected from the groups consisting of magnesium and zinc and (2) at least one ligand selected from the group consisting of phosphines and phosphites, while in the presence of hydrogen, at temperatures from about 0° C. to about 200° C. and hydrogen pressure ranging from about 0 to about 10,000 pounds per square inch gauge (p.s.i.g.).

The component of this invention which comprises the nickel on metal oxalate is comprised of nickel oxalates decomposed on supports such as magnesium and zinc oxalates. This useful component is obtained by preparing a mixed nickel oxalate/magnesium or zinc oxalate and reductively decomposing the nickel oxalate so that the nickel metal is deposited on the magnesium or zinc oxalate. A typical but not limiting method of reductively decomposing the mixed nickel oxalate/magnesium or zinc oxalate is by heating the mixture in a hydrogen atmosphere at about 200° C. to about 350° C. from about 1 to about 4 hours. The nickel/magnesium or zinc oxalate formed upon decomposition is a black pyrophoric powder and contains magnesium or zinc oxalate which functions as a support.

The catalyst formation may be illustrated by the following equation:

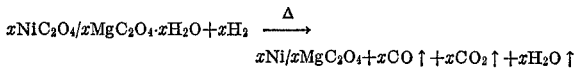

$xNiC_2O_4/xMgC_2O_4 \cdot xH_2O + xH_2 \xrightarrow{\Delta}$
$xNi/xMgC_2O_4 + xCO\uparrow + xCO_2\uparrow + xH_2O\uparrow$ The mixed nickel/magnesium or zinc oxalate was prepared by mixing and stirring together aqueous solutions of nickel salts, magnesium or zinc salts and oxalic acid. The amounts of the reactants may be varied to give different percentages of nickel and magnesium or zinc in the mixture.

The mole ratio of nickel oxalate/magnesium or zinc oxalate can range from about .1/1 to about 9/1. The preferred mole ratio is from about .25/1 to about 1.5/1.

The preferred range of the nickel metal is therefore from about 20 to about 60 mole percent by weight of the catalyst. Specific amounts of the salts and concentrations cannot be set forth since factors such as purity, different starting salts which may be utilized and the desired percent of each ingredient may be varied.

The combined use of the catalyst and the ligand in this invention, gives the high selectivity to the desired product.

The molar ratio of ligand/Ni that can be used in this invention can range from about 1/1 to about 5/1 based on the amount of nickel in the reductively decomposed catalyst. The preferred molar ratio is from about 1.5/1 to about 2.5/1.

The component of the catalyst used in this invention which greatly enhances the overall activity of the catalytic system and helps to make a new type of catalyst are compounds which contain an atom or radical which is capable of leading or sharing electrons with the nickel metal used in this invention. Such compounds may be called "ligands." "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed.

Compounds which are capable of functioning as useful ligands in this invention are phosphines and phosphites.

The phosphine subclass can be defined by the formula

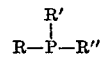

where R, R' and R" may represent alkyl, cycloalkyl, aryl, alkaryl and arylalkyl radicals containing from about 1 to about 10 carbon atoms; R, R' and R" may be the same or dissimilar. These phosphines represent a class of compounds which have three carbon atoms attached by single bonds to phosphorus atom. Representative but not exhaustive of the phosphines useful as ligands in this invention are trimethyl, tributyl phosphines or triphenyl phosphine, methyl diethyl phosphine, methyl ethyl propyl phosphine or methyl ethyl phenyl phosphine, methyl diphenyl phosphine, phenyl dimethyl phosphine, cyclohexyl methyl butyl phosphine, diisobutyl tolyl phosphine and the like.

The phosphite subclass can be defined by the formula

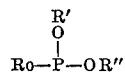

where R, R' and R" represent alkyl, cycloalkyl, aryl, alkaryl, and arylalkyl radicals containing from about 1 to about 10 carbon atoms; R, R' and R" may be the same or dissimilar. These phosphites represent a class of compounds which have three carbon atoms attached to three oxygen atoms by single bonds and the oxygen atoms attached by single bonds to a phosphorous atom. Representative but not exhaustive of the phosphites useful as ligands in this invention are trimethyl phosphite, triethyl phosphite, tributyl phosphite, triphenyl phosphite, methyl ethyl propyl phosphite, methyl ethyl phenyl phosphite and dimethyl phenyl phosphite, methyl ethyl phosphite, diethyl phenyl phosphite and diphenyl ethyl phosphite.

Although the hydrogenation examples were carried out batchwise in these examples, it should be understood that the hydrogenation reaction may be carried out continuously over a fixed bed or in a fluid bed. The hydrogenation may be carried out with or without a solvent. If a solvent is used it should be one that will not undergo reduction.

The temperature range used for the hydrogenation reaction may be from about 0° C. to about 200° C. The preferred range is from about 20° C. to about 100° C. The pressure under which the hydrogenation reaction may be conducted can be from about zero pounds square inch gauge (p.s.i.g.) to about 10,000 pounds square inch gauge (p.s.i.g.). However, it may be advantageous to conduct the hydrogenation in the range of atmospheric pressure to about 1000 pounds per square inch gauge (p.s.i.g.).

Further practice of this invention is illustrated by reference to the following examples which are intended to be illustrative and in no manner limiting.

EXAMPLE I

The cyclopentadiene (10 grams) was mixed with 40–50 milliliters of ethanol in a 500 milliliter Parr hydrogenation bottle. One-tenth (0.1) gram of nickel/magnesium oxalate and 0.86 gram tributyl phosphite, $(BuO)_3P$, were added to the ethanol solution. The bottle is then closed and allowed to rock and heat at 135° F. in the hydrogenation equipment under hydrogen pressure of 55–60 pounds per square inch gauge (p.s.i.g.) until a desired drop in the hydrogen pressure is achieved. The time for reaction was 40–45 minutes. Then all of the cyclopentadiene was hydrogenated with 90 percent going to cyclopentene and 10 percent going to cyclopentane.

diene to cyclopentene by bringing said cyclopentadiene into contact with a catalyst consisting essentially of (1) nickel, on a metal oxalate support, said metal being selected from the group consisting of magnesium and zinc, and (2) a ligand selected from the group consisting of trimethyl phosphine, methyl diethyl phosphine, methyl ethyl propyl phosphine, trimethyl phosphite, triethyl phospite, tributyl posphite, triphenyl phosphite, methyl ethyl propyl phosphite, methyl ethyl phenyl phosphite, dimethyl phenyl phosphite, tributyl phosphine, triphenyl phosphine, methyl ethyl phenyl phosphine, while in the presence of hydrogen, at temperatures from about 0° C. and pressures from atmospheric to about 1000 pounds pressure per square inch gauge (p.s.i.g.).

2. A process according to Claim 1 in which the nickel constitutes from about 10 molar percent to about 90 molar percent by weight of the component (1) of the catalyst.

3. A process according to Claim 2 in which the preferred amount of nickel ranges from about 20 molar percent to about 60 molar percent by weight of the component (1) of the catalyst.

4. A process according to Claim 1 in which the ligand of component (2) is selected from the group consisting of phosphines and phosphites.

5. A process according to Claim 1 in which the mole ratio of the ligand of component (2)/nickel of component (1) ranges from about 1/1 to about 5/1.

6. A process according to Claim 5 in which the preferred mole ratio of the ligand of component (2)/nickel of component (1) ranges from about 1.5/1 to about 2.5/1.

TABLE 1

| Run | CPD [1] (gms.) | CPD Ni/Mg-ox.[2] weight ratio | Solvent | Ligand [3] | Time, min. | Temp., °F. | Conv. of CPD to products | Products [4] |
|---|---|---|---|---|---|---|---|---|
| 1 | 10 | 100 | EtOH | $(BuO)_3P$, .86 gm. | 40–45 | 135 | 100 | 90% CPE / 10% CPA |
| 5 | 10 | 100 | EtOH | $(Ph)_3P$, .89 gm. | 120 | 135 | 98.4 | 88% CPE / 12% CPA |
| 6 | 10 | 100 | ⌬—Me | $(Ph)_3P$, .89 gm. | 130 | 135 | 100 | 85% CPE / 15% CPA |

[1] CPD = Cyclopentadiene.
[2] ox. = Oxalate.
[3] Ligand/nickel = 2/1 (molar ratio).
[4] CPE = Cyclopentene; CPA = Cyclopentane.

EXAMPLE II

This example is the same as Example I except that the ligand was not used. It can be noted that the conversion of the hydrocarbon is much lower than with the ligand.

7. A process for selectively hydrogenating cyclopentadiene to cyclopentene by bringing said cyclopentadiene into contact with a catalyst consisting essentially of (1) nickel, on a metal oxalate support, said metal being selected from the group consisting of magnesium and zinc, and (2) a

TABLE 2

| Run | CPD [1] (gms.) | CPD Ni/Mg-ox.[2] weight ratio | Solvent | Time (min.) | Temp. (°F.) | Conv. of CPD to products | Products [3] |
|---|---|---|---|---|---|---|---|
| 1 | 10 | 100 | EtOH | 120 | 125 | 4 | 100% CPE |
| 2 | 10 | 50 | EtOH | 120 | 130 | 20 | 100% CPE |
| 3 | 10 | 15 | EtOH | 120 | 135 | 40 | 100% CPE |

[1] CPD = Cyclopentadiene.
[2] ox. = oxalate.
[3] CPE = Cyclopentene.

While certain representative embodiments and details have been shown for the purpose of illustrating the invention, it will be apparent to those skilled in this art that various changes and modifications may be made therein without departing from the spirit or scope of the invention.

What is claimed is:

1. A process for selectively hydrogenating cyclopentaligand selected from the group consisting of trimethyl phosphine, tributyl phosphine, triphenyl phosphine, methyl ethyl propyl phosphine, methyl diphenyl phosphine, phenyl dimethyl phosphine, cyclohexyl methyl butyl phosphine, diisobutyl tolyl phosphine, trimethyl phosphite, tributyl phosphite, triphenyl phosphite, methyl ethyl phosphite, methyl ethyl phenyl phosphite, diethyl phenyl phosphite and diphenyl ethyl phosphite, while in the presence of hydrogen, at temperatures from about 0° C. and pressures from atmospheric to about 1000 pounds pressure per square inch gauge (p.s.i.g.).

References Cited

UNITED STATES PATENTS

| | | | |
|---|---|---|---|
| 3,110,747 | 11/1963 | Mullineaux | 260—677 H |
| 3,004,914 | 10/1961 | White | 260—677 H |
| 3,041,385 | 6/1962 | Bourne | 260—677 H |
| 3,274,282 | 9/1966 | Bourne | 260—677 H |
| 3,472,763 | 10/1969 | Cosyns | 260—677 H |

VERONICA O'KEEFE, Primary Examiner

U.S. Cl. X.R.

252—431 C, P; 260—677 H